US006744185B2

(12) United States Patent
Kim

(10) Patent No.: US 6,744,185 B2
(45) Date of Patent: Jun. 1, 2004

(54) BEAM-INDEX-TYPE CATHODE RAY TUBE

(75) Inventor: Tae-Sung Kim, Incheon (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 10/084,189

(22) Filed: Feb. 28, 2002

(65) Prior Publication Data

US 2003/0020410 A1 Jan. 30, 2003

(30) Foreign Application Priority Data

Jun. 8, 2001 (KR) ........................................ 2001-32194

(51) Int. Cl.[7] ............................ H01J 29/34; H04N 9/24
(52) U.S. Cl. ............................................ 313/10; 315/10
(58) Field of Search ......................... 313/471, 2.1, 461, 313/466, 467, 470; 315/10, 11, 11.5; 365/118, 128

(56) References Cited

U.S. PATENT DOCUMENTS 4,908,547 A * 3/1990 Toyama et al. ............. 313/471
5,952,767 A * 9/1999 Kuwabara et al. ........... 313/2.1
6,400,085 B1 * 6/2002 Kim ............................ 315/10

FOREIGN PATENT DOCUMENTS

| | | |
|---|---|---|
| JP | 52087356 | 7/1977 |
| JP | 62216138 | 9/1987 |

* cited by examiner

*Primary Examiner*—James Clinger
(74) *Attorney, Agent, or Firm*—Staas & Halsey LLP

(57) ABSTRACT

A beam-index-type cathode ray tube includes a vacuum tube defined by a panel and a funnel having a neck; a phosphor screen provided with index stripes to provide color selection, the phosphor screen being formed on an aluminum metal back layer; an electron gun mounted inside the neck to emit electron beams to the phosphor screen; a deflection yoke mounted around the neck; a light reception window provided on the funnel; a detector to generate an index electric signal by condensing index light generated from the index stripes through the light reception window; and an index circuit to transmit a signal obtained by synchronizing the index signal with a color signal. When a diagonal length on the outer surface of the funnel is "d", the light reception window is provided at a location within a range of 0.1–0.3 d from a corner of a seal edge of the funnel.

13 Claims, 5 Drawing Sheets

BEAM-INDEX-TYPE CATHODE RAY TUBE

CROSS-REFERENCE TO RELATED APPLICATIONS

This application claims the benefit of Korean Patent Application No. 2001-32194 filed with the Korea Industrial Property Office on Jun. 8, 2001, the disclosure of which is incorporated herein by reference.

BACKGROUND OF THE INVENTION

1. Field of the Invention

The present invention relates to a cathode ray tube (CRT), and more particularly, to a beam-index-type CRT that can optimize light reception efficiency of index light generated on a screen.

2. Description of the Related Art

Generally, a color CRT is designed to realize an image by electron-beams emitted from an electron gun and scanning a phosphor screen deposited with red R, green G, and blue B phosphors. As the CRT is not costly and provides a clear image, it is widely used as a TV and a computer monitor.

However, such a CRT is composed of a large number of parts, such as a color selection apparatus to select red R, green G, and blue B electron beams corresponding to the R, G, and B phosphors, and an inner shield to shield the electron beams from outer magnetic fields such as geomagnetism. In addition, when a shadow mask of the color selection apparatus is thermally expanded by electron beams within a high current range, the color purity of the CRT is deteriorated.

Therefore, in recent years, a beam-index-type CRT that does not use the shadow mask and the inner shield has been proposed. That is, the beam-index-type CRT has a phosphor screen on which index stripes for color selection are formed and an index light detector is mounted on a funnel. When a ray of the electron beam emitted from an electron gun excites a corresponding index stripe to generate the index light, the index light detector detects the index light to synchronize an index signal with a color signal, thereby realizing the desired color.

As the shadow mask is not used, electron beam mis-landing, caused by doming of the shadow mask, is prevented. In addition, as only a single electron beam ray is used to realize the color image, mis-convergence caused by a plurality of electron beams can be also prevented.

However, the phosphor should be precisely designed in its size so that the electron beam does not strike an undesired phosphor when a ray of an electron beam strikes a pixel of the phosphor, and the landing angle of the electron beam to a periphery of the screen should not be inclined.

In addition, as the location of the electron beam is controlled under the index signal, the definition of the image, the index light generated in the index stripe, should be effectively detected. That is, the light reception rate should be high. The light reception rate is highly affected by where the index light detector is mounted on the funnel.

More specifically, when the index light detector is mounted in the vicinity of the neck, although the index light generated in the index stripe provided on the center of the phosphor screen is effectively detected, the index light generated in the index stripe provided on the periphery of the phosphor screen is not effectively detected as the distance from the detector to the index stripe is far and the phosphors in the periphery area are close to the range out of the viewing angle of the detectors.

On the contrary, when the index light detector is mounted in the vicinity of a corner of the funnel, although the index light generated in the index stripe provided on the periphery of the phosphor screen is effectively detected, the index light generated in the index stripe provided on the center of the phosphor screen is not effectively detected as the distance from the detector to the index stripe is far and the phosphors in the periphery area are close to the range out of the viewing angle of the detectors.

For the above-described reason, Japanese Laid-open patent Nos. Sho 52-87356 disclose a beam-index-type CRT in which even numbers of index light detectors are mounted on the funnel symmetrically centering around a tube axis, and Sho 62-216138 disclose a beam-index-type CRT in which plural index light detectors are mounted on the funnel.

However, even though plural index light detectors are mounted on the funnel, mounting locations of the detectors to more effectively detect the index light generated on the index stripes provided on both the center and periphery of the phosphor screen are not accurately proposed.

SUMMARY OF THE INVENTION

Accordingly, it is an object of the present invention to provide a beam-index-type cathode ray tube (CRT) that can optimize the light reception rate of the index light generated on the center and periphery of the phosphor screen.

The foregoing and other objects of the present invention may be achieved by providing a beam-index-type CRT comprising a vacuum tube defined by a panel and a funnel having a neck; a phosphor screen provided with index stripes to provide color selection, the phosphor screen being formed on an inner surface of the panel; an electron gun mounted inside the neck to emit electron beams toward the phosphor screen; a deflection yoke mounted around the neck; a transparent light reception window provided on the funnel; a detector to generate an index signal by condensing index light generated from the index stripes through the light reception window; and an index circuit to transmit a signal obtained by synchronizing the index signal with a color signal, wherein when a diagonal length on the outer surface of the funnel is "d", the center of the transparent light reception window is provided at a location within a range of 0.1–0.3 d along the outer surface of the funnel from a corner of a seal edge of the funnel.

In an embodiment of the present invention, the light reception window is provided on each of four connecting lines that respectively connect corners of a seal edge of the funnel to the neck.

Further, an embodiment of the present invention provides that the light reception window is provided at a location within a range defined by rotating the connecting lines by 0–30° clockwise or counterclockwise.

The foregoing and other objects of the present invention may also be achieved by providing a beam-index-type CRT comprising a vacuum tube defined by a panel and plural funnels each having a neck; a phosphor screen provided with index stripes to provide color selection, the phosphor screen being formed on an inner surface of the panel; an electron gun mounted inside each of the necks to emit electron beams to the phosphor screen; a deflection yoke mounted around each of the necks; a transparent light reception window provided on each of the funnels; a detector to generate an index signal by condensing index light generated from the index stripes through the light reception windows; and an index circuit to transmit a signal obtained by synchronizing the index signal with a color signal, wherein when a diagonal length on the outer surface of each of the funnels is "d", each center point of the light reception windows is provided on a location within a range of 0.1–0.3 d from a corner of a seal edge of each funnel.

In this embodiment, the phosphor screen is divided into at least two regions, and plural funnels corresponding to the divided regions are provided.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
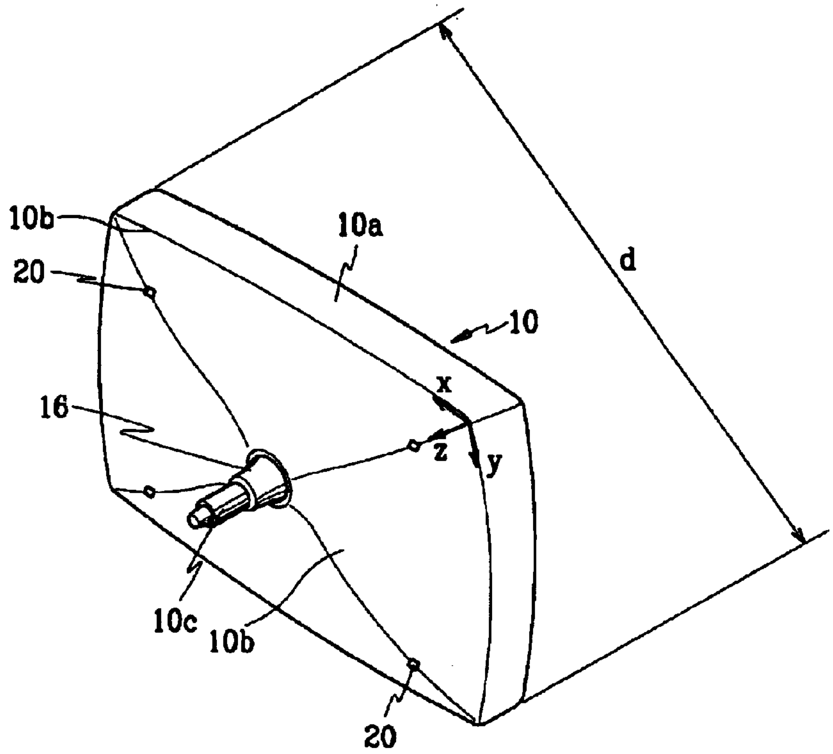
FIG. 1 is a perspective view of a beam-index-type CRT according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
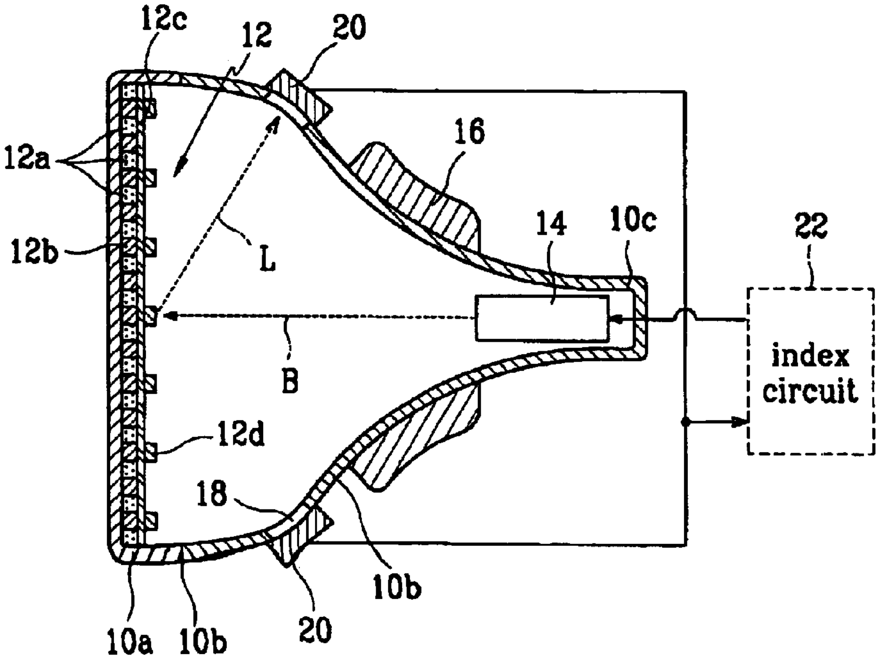
FIG. 2 is a sectional view of the diagonal direction d of FIG. 1.

FIG. 1 illustrates a perspective view of a beam-index-type CRT according to an embodiment of the present invention, and FIG. 2 illustrates a sectional view of FIG. 1.

As illustrated in the figures, a cathode ray tube is formed of a vacuum tube 10 having a panel 10*a* defining a front screen, a funnel 10*b* connected to a rear end of the panel 10*a*, and a neck 10*c* connected to a rear end of the funnel 10*b*.

Formed on an inner surface of the panel 10*a* is a phosphor screen 12 having red R, green G, and blue B phosphors 12*a*. Each of the phosphors 12*a* is formed in a stripe-shape, and a black matrix 12*b* is formed between the phosphors 12*a*. The black matrix 12*b* and the phosphors 12*a* are covered with an aluminum metal back 12*c*.

Furthermore, index stripes 12*d* to transmit index signals are formed on the aluminum metal back 12*c* to correspond to the black matrix 12*b*.

Mounted inside the neck 10*c* is an electron gun 14 to emit electron beams toward the screen 12. A deflection yoke 16 is mounted around the neck 10*c* to deflect the electron beams "B" emitted from the electron gun 14.

As the CRT is an index type, a light reception window 18 and a detector 20, to detect index light L generated from the stripes 12*d* through the light reception window 18, are mounted on the funnel 10*b*. The detector 20 comprises a condensing plate (not shown) to convert light signals, generated on the index stripes 12*d*, from a range of near-ultraviolet to long-wave light signals and to transmit the converted light signals using its reflecting property, and a photosensitive diode (not shown) mounted on one side of the condensing plate to receive the converted light signals from the condensing plate and convert the received light signals into electrical signals.

At this point, the index signals of the photosensitive diode are transmitted to an index circuit part 22, which transmits accurate color signals obtained by synchronizing the index signals with color signals to the electron gun 14.

In a 29"-CRT with a deflection angle of 110°, the length of the outer surface of the funnel in a horizontal direction X is 600 mm, the length of the same surface in the vertical direction Y is 420 mm, and the length of the same surface in the diagonal direction Z is 720 mm.

The shortest length from the center on the outer surface of the funnel 10*b* to a corner of a seal edge 10*b*' is about 350 mm, which may be varied according to a design deflection angle. That is, in a CRT having a maximum deflection angle of 110°, the shortest length is 340 mm.

Accordingly, due to the shape of the corner of the seal edge 10*b*' of the funnel 10*b*, the location where the light reception window 18 can be located is limited to a range of 50–250 mm from the corner of the seal edge 10*b*' in the diagonal direction Z. This will be described in more detail in connection with the outer shape of the funnel hereinafter.

When the diagonal length on the outer surface of the funnel 10*b* is "d" (d=720 mm), since the light reception window 18 may be located in a range of 50–250 mm from the corner of the seal edge 10*b*' in the diagonal direction Z of the funnel, the location of the light reception window 18 is limited to a range of 0.07–0.35 d. However, when considering the design of the funnel, the range may be varied according to the diameter of the deflection yoke 16 and the curvature of the funnel 10*b*.

Figure 3:
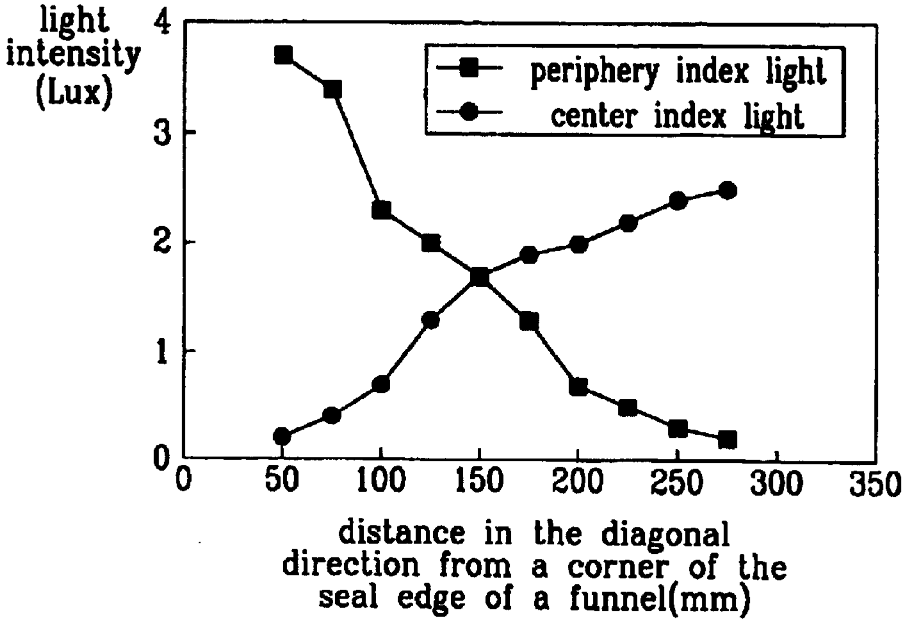
FIG. 3 illustrates index light intensity generated on the center and periphery of the screen of a 29"-CRT having a deflection angle of 110°.
Figure 4:
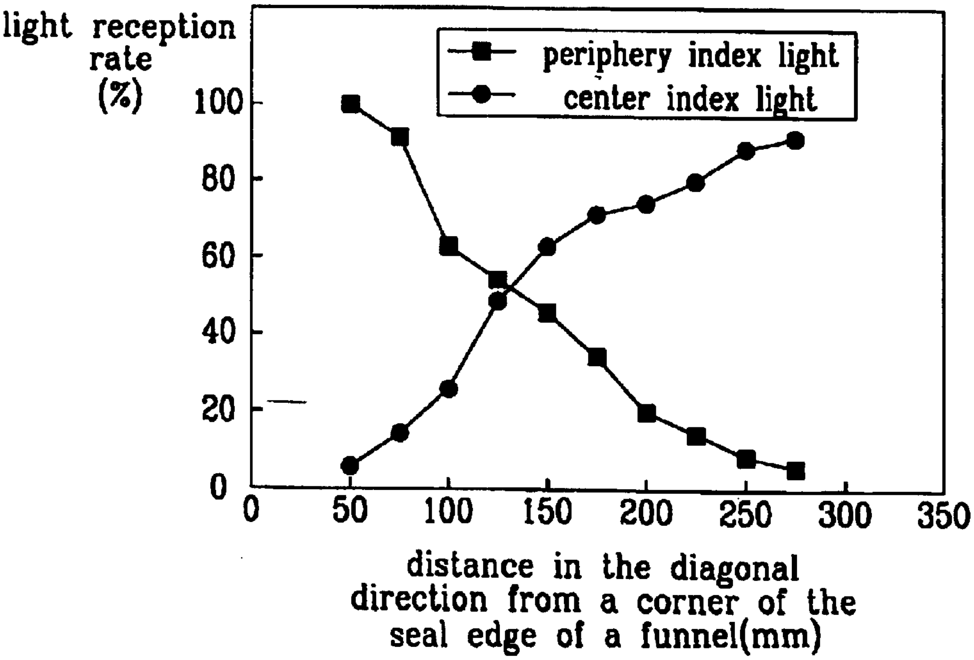
FIG. 4 illustrates a light reception rate of index light generated on the center and periphery of the screen of the 29"-CRT having a deflection angle of 110°.

FIG. 3 illustrates an index light intensity generated on the center and periphery of the screen of a 29"-CRT having a deflection angle of 110°, and FIG. 4 illustrates a light reception rate of index light generated on the center and periphery of the screen of the 29"-CRT having a deflection angle of 110°. The test was conducted with respect to index light detected through a signal detector 20 and a light reception window 18.

When the light reception window 18 and the detector 20 are provided on a location at a distance of 50 mm in the diagonal direction from the corner of the seal edge 10*b*' of the funnel 10*b*, the light intensity of the index light generated on the center of the phosphor screen 12 (hereinafter referred as "center index light") is remarkably lower than that of the index light generated on the periphery of the phosphor screen 12 (hereinafter referred as "periphery index light"). When the light reception window 18 and the detector 20 are provided on a location at a distance of 250 mm in the diagonal direction from the corner of the seal edge 10*b*' of the funnel 10*b*, the light intensity of the periphery index light is remarkably lower than that of the center index light. When the light reception window 18 and the detector 20 are provided on a location at a distance of 100–200 mm in the diagonal direction from the corner of the seal edge 10*b*' of the funnel 10*b*, the light intensity difference between the periphery index light and the center index light is remarkably reduced when compared with the above.

In FIG. 3, it is illustrated that when the light reception window 18 and the detector 20 are provided at a location at a distance of 150–200 mm in the diagonal direction from the corner of the seal edge 10*b*' of the funnel 10*b*, the central index light intensity is higher than the periphery index light intensity. However, the central index light is detected by other detectors mounted on the outsides of the other three light reception windows.

Accordingly, an embodiment of the present invention provides that the light reception window 18 and the detector 20 mounted on a location within a range where the periphery index light intensity is detected to be higher than the central index light intensity is desired. According to tests performed, these results have been determined to be achieved with the light reception window 18 and the detector 20 provided on a location within a range of 100–150 mm in the diagonal direction from the corner of the seal edge 10*b*' of the funnel 10*b*. When considering this result in connection with the length (d=720 mm) in the diagonal direction Z of the funnel 10*b*, the light reception window 18 and the detector 20 are preferably provided on a location within a range of 0.14 d–0.21 d from the corner of the seal edge 10*b*'.

Figure 5:
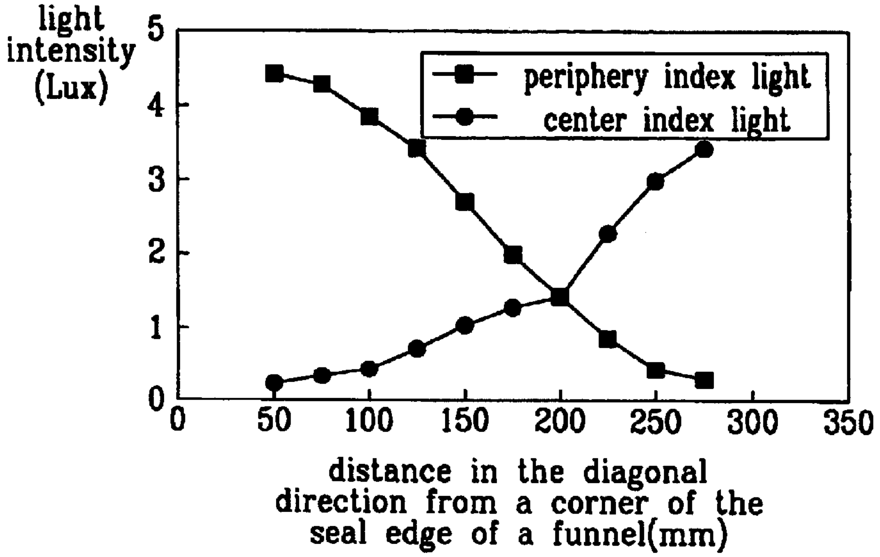
FIG. 5 illustrates index light intensity generated on the center and periphery of the screen of a 29"-CRT having a deflection angle of 120°.
Figure 6:
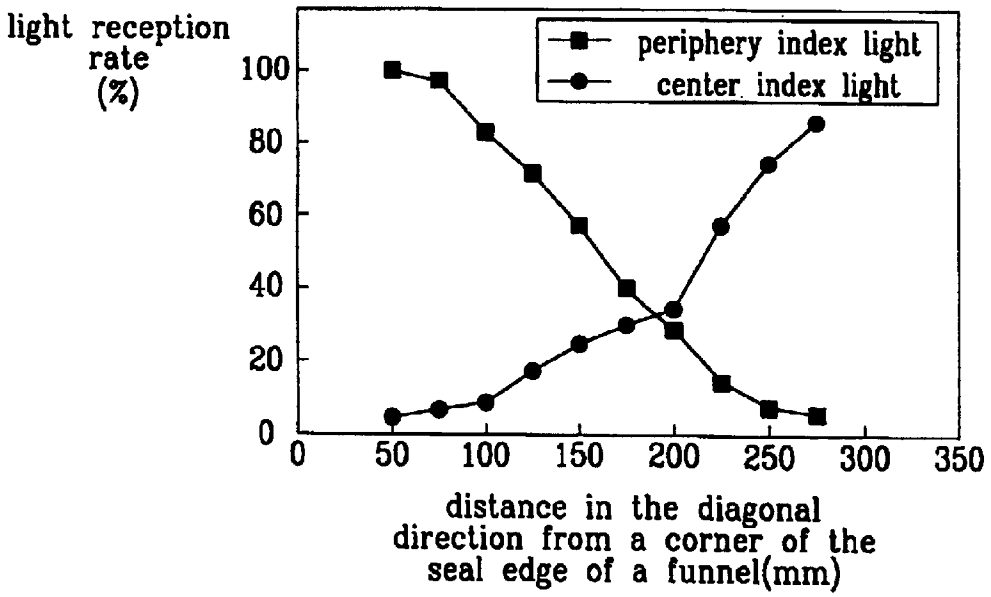
FIG. 6 illustrates a light reception rate of index light generated on the center and periphery of the screen of the 29"-CRT having a deflection angle of 120°.

FIG. 5 illustrates an intensity of the index light generated on the center and periphery of the screen of a 29"-CRT having a deflection angle of 120°, and FIG. 6 illustrates a light reception rate of index light generated on the center and periphery of the screen of the 29"-CRT having a deflection angle of 120°. Likewise, these tests were conducted with respect to index light detected through a signal detector 20 and a single light reception window 18.

Referring to FIGS. 5 and 6, when the light reception windows 18 are provided on a location at a distance of 150–250 mm in the diagonal direction Z from the corner of the seal edge 10*b*' of the funnel 10*b*, the light intensity difference between the periphery index light and the center index light is remarkably reduced. Since the light reception window 18 provided on a location within a range where the periphery index light intensity is detected to be higher than the central index light intensity is desired, it is most effective to provide the light reception window 18 on a location at a distance of 150–200 mm in the diagonal direction Z from the corner of the seal edge 10*b*' of the funnel 10*b*.

As described above, it is noted that the most optimal location of the light reception window applied for the CRT having the deflection angle of 120° is slightly shifted toward the center of the funnel since the angle between the inner surface of the panel 10*a* and the detector 20 is slightly reduced as the deflection angle is varied. Accordingly, when considering the above results in connection with the length (d=720 mm) in the diagonal direction Z of the funnel 10*b*, it is preferable that the light reception window 18 is provided on a location within a range of 0.21 d–0.28 d from the corner of the seal edge 10*b*' with a deflection angle of 120°.

The following Table 1 illustrates the index light intensity of the center/periphery at a light reception window applied to a 25"-CRT having a deflection angle of 105° according to an embodiment of the present invention.

| Light reception | Length of outer surface of funnel in diagonal direction (mm) | | | | |
|---|---|---|---|---|---|
| rate (% | 50 | 100 | 150 | 200 | 250 |
| Center | 7 | 26 | 71 | 81 | 93 |
| Periphery | 100 | 55 | 39 | 23 | 5 |

Figure 7:
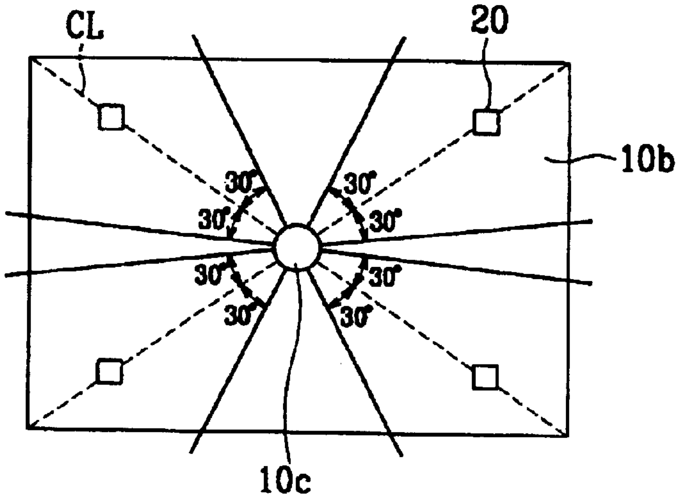
FIG. 7 is a rear view of a beam-index-type CRT according to another embodiment of the present invention.

In the above embodiment, although the light reception window is provided on a line CL connecting the seal edge corner 10*b*' and the neck 10*c*, as illustrated in FIG. 7, the light reception window may be provided within a range which is defined by rotating the line CL clockwise or counterclockwise.

The following Table 2 illustrates a light reception rate of the periphery index light when the light reception window 18 is provided on a location where the line CL is rotated by 10°, 20° and 30° clockwise or counterclockwise. As illustrated in Table 2, it is noted that the light reception window 18 may be provided on a location within a range defined by rotating the line CL by 30° clockwise or counterclockwise. The light reception rate illustrated in Table 2 is obtained when the light reception window 18 and the detector 20 are provided at a distance of 100 mm from the corner and when the light reception rate obtained when the light reception window 18 and the detector are provided on the line CL is set at 100%.

| | Rotation angle | | |
|---|---|---|---|
| CRT size (inch) | 10° | 20° | 30° |
| 25" | 98% | 93% | 90% |
| 29" | 97% | 91% | 85% |

As described above, an embodiment of the present invention provides that the light reception window is provided at a location within a rage of 0.1 d–0.3 d in the diagonal direction from the corner of the seal edge of the funnel. In addition, the light reception window may be provided at a location within an angle range defined by rotating the line CL by 0–30° clockwise or counterclockwise.

Figure 8:
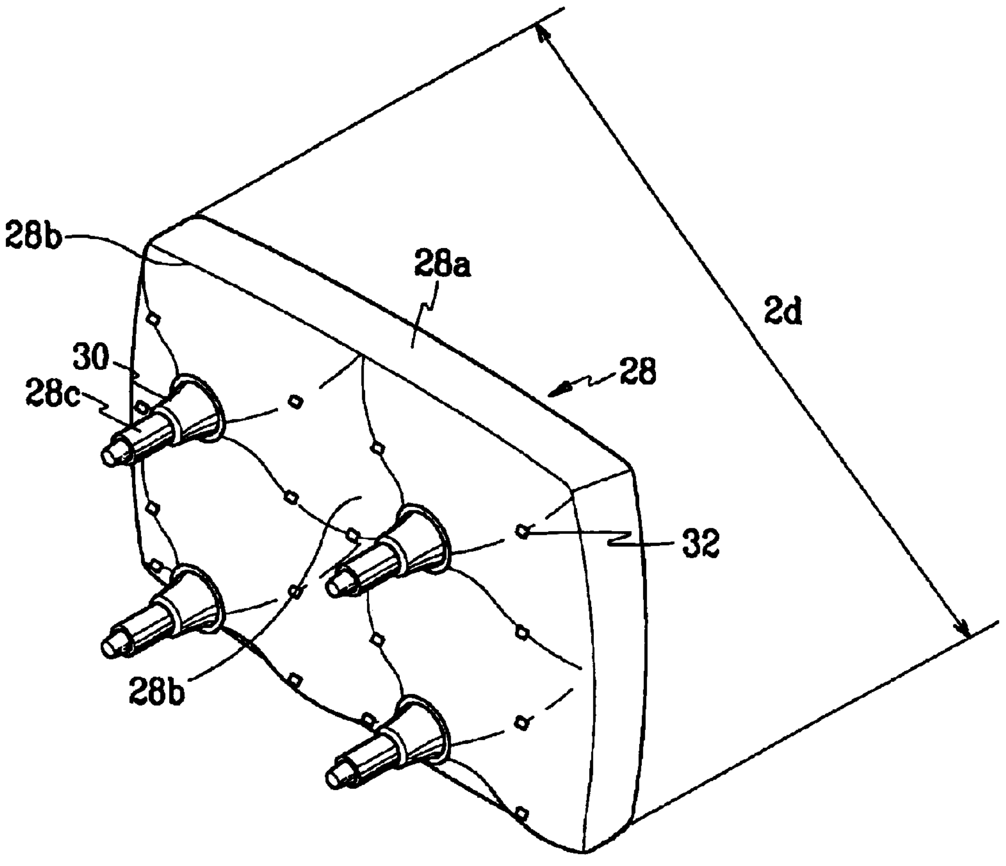
FIG. 8 is a perspective view of a beam-index-type CRT according to yet another embodiment of the present invention.
Figure 9:
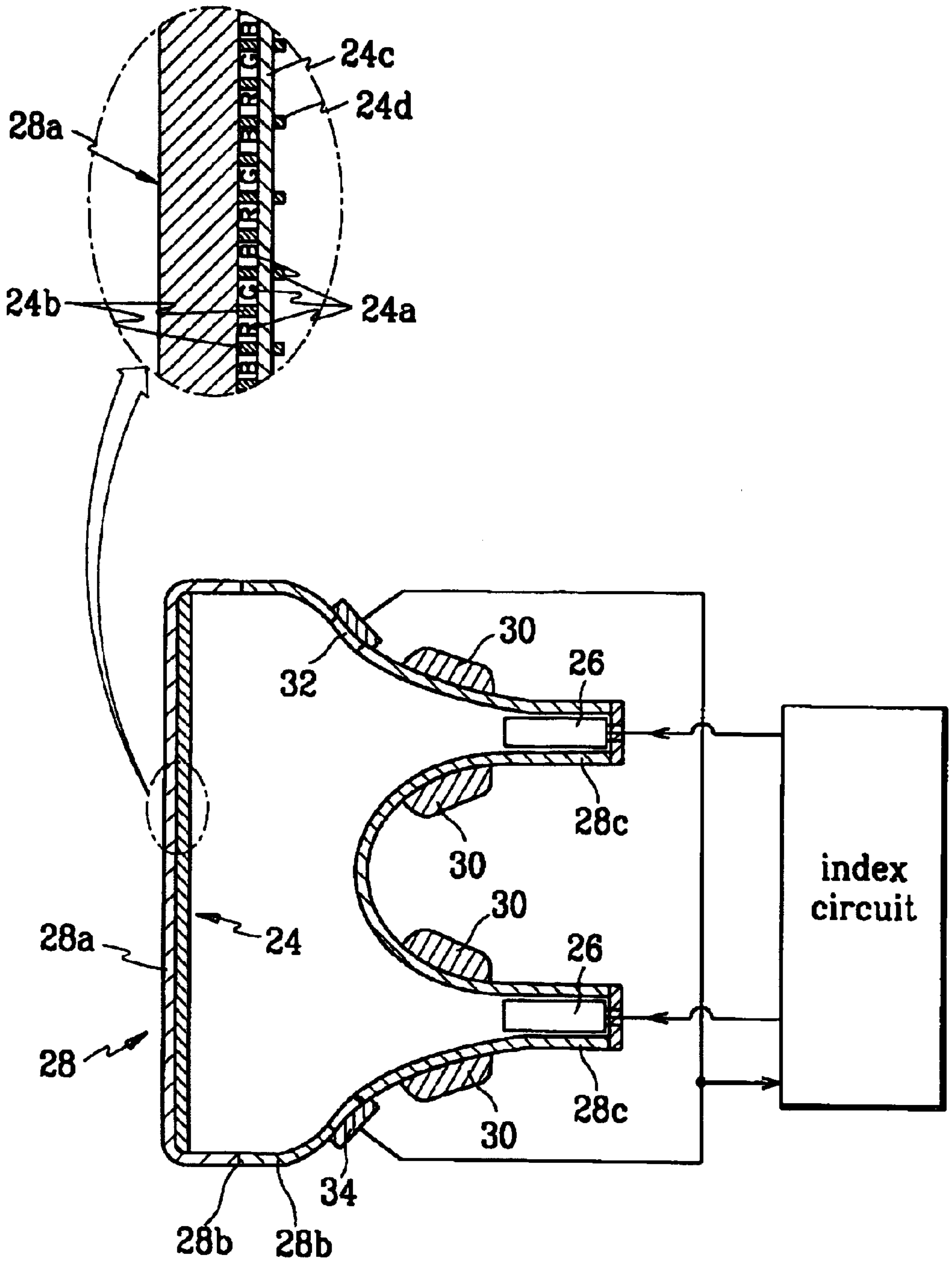
FIG. 9 is a sectional view of FIG. 8.

FIGS. 8 and 9 illustrate a beam-index-type CRT according to another embodiment of the present invention, in which the CRT is a multi-neck CRT having plural electron guns.

As illustrated in the drawings, the phosphor screen 24 is divided into at least two regions (four regions in this embodiment), and the electron guns 26 are provided corresponding to the divided screen regions. The electrons emitted from each of the electron guns 26 are directed to the corresponding regions.

Describing in more detail with reference to FIGS. 8 and 9, four funnels 28*b*, each having a neck 28*c*, are integrally connected to a rear end of a panel 28*a*, thereby defining a tube 28. An electron gun 26 is mounted on each of the necks 28*c* around each of which a deflection yoke 30 is mounted.

In addition, each of the funnels 28*b* is provided with a light reception window 32 and a detector 34 to detect index light from index stripes 24*d*. In this embodiment, the light reception windows 32 are provided at a location defined by the concept described in the above embodiments. That is, for each funnel 28*b*, when the length of the outer surface of the funnel 28*b* in the diagonal direction Z is "d'", the light reception window 32 is provided at a location within a range of 0.1–0.3 d' in the diagonal direction from a corner of a seal edge 28*b*' of the funnel 28*b*. In addition, the light reception window 32 may be provided on a location within a range defined by rotating a line connecting the corner of the seal edge 28*b* to the neck by 0–30° clockwise or counterclockwise.

The reference characters 24*a*, 24*b*, and 24*c* that are not described above respectively indicate red R, green G, and blue B phosphors; a black matrix; and an aluminum metal back.

In operation, the electron beams emitted from each electron gun 26 are directed to the corresponding region of the phosphor screen 24, thereby realizing an image. At this point, the index light generated on the index stripes 24*d* is detected by the detector 34 provided at the corresponding region.

That is, the electron guns 26 simultaneously emit electron beams to the divided screen 24 to realize the image. At this point, the index signals required to operate each of the electron guns 26 are generated when the detectors 34 detect the index light from the index stripes 24*d* of the divided screen 24.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A beam-index-type cathode ray tube, comprising:

a vacuum tube defined by a panel and a funnel having a neck;

a phosphor screen provided with index stripes to provide color selection, the phosphor screen being formed on an inner surface of said panel;

an electron gun mounted inside said neck to emit electron beams toward said phosphor screen;

a deflection yoke mounted around said neck;

a transparent light reception window provided on said funnel;

a detector to generate an index electric signal by condensing index light generated from said index stripes through said light reception window; and an index circuit to transmit a signal obtained by synchronizing said index signal with a color signal, wherein when a diagonal length on an outer surface of said funnel is "d", said light reception window is provided at a location within a range of 0.1–0.3 d from a corner of a seal edge of said funnel.

2. The beam-index-type cathode ray tube according to claim 1, further comprising three additional light reception windows such that a light reception window is provided on each of four connecting lines that respectively connect corners of said funnel to said neck.

3. The beam-index-type cathode ray tube according to claim 2, wherein said light reception windows are provided at a location within a range defined by rotating said connecting lines by 0–30° clockwise or counterclockwise.

4. The beam-index-type cathode ray tube according to claim 1, wherein said diagonal length "d" is 720 mm and a deflection angle of said electron beams is 110 degrees.

5. The beam-index-type cathode ray tube according to claim 1, wherein said light reception window is provided at a location within a range of 0.14–0.21 d from the corner of said seal edge of said funnel, said diagonal length "d" is 720 mm and a deflection angle of said electron beams is 110°.

6. The beam-index-type cathode ray tube according to claim 1, wherein said light reception window is provided at a location within a range of 0.21–0.28 d from the corner of said seal edge of said funnel, said diagonal length "d" is 720 mm and a deflection angle of said electron beams is 120°.

7. A beam-index-type cathode ray tube, comprising:

a vacuum tube defined by a panel and plural funnels each having a neck;

a phosphor screen provided with index stripes to provide color selection, the phosphor screen being formed on an inner surface of said panel;

electron guns respectively mounted inside each of said necks to emit electron beams toward said phosphor screen;

deflection yokes respectively mounted around each of said necks;

light reception windows respectively provided on each of said funnels;

detectors respectively provided at each of said light reception windows to generate index signals by condensing index light generated from said index stripes through the light reception windows; and an index circuit to transmit signals obtained by synchronizing said index signals with color signals, wherein when a diagonal length on an outer surface of each of said funnels is "d", each of said light reception windows is provided on a location within a range of 0.1–0.3 d from a corner of a seal edge of each said funnel.

8. The beam-index-type cathode ray tube according to claim 7, wherein said phosphor screen is divided into at least two regions, and at least two of said funnels corresponding to the divided regions are provided.

9. The beam-index-type cathode ray tube according to claim 7, wherein said light reception windows are respectively provided on each of four connecting lines that respectively connect corners of said corresponding funnel to said corresponding neck.

10. The beam-index-type cathode ray tube according to claim 9, wherein each of said light reception windows are provided in a range defined by rotating said connecting lines by 0–30° clockwise or counterclockwise.

11. A beam-index-type ray tube, comprising:

a vacuum tube defined by a panel and a funnel having a neck;

a phosphor screen provided with index stripes to provide color selection, the phosphor screen being formed on an inner surface of said vacuum tube;

an electron gun mounted inside the neck to emit electron beams to the phosphor screen;

a deflection yoke mounted around the neck;

a transparent light reception window provided on the funnel;

a detector to generate an index electric signal by condensing index light generated from the index stripes through the light reception window; and an index circuit to transmit a signal obtained by synchronizing the index signal with a color signal;

wherein said light reception window and said detector are mounted on a location within a range where a periphery index light intensity is detected to be higher than a central index light intensity, wherein said light reception window and said detector are positioned in one of two fashions:

along a diagonal of the outer surface of said funnel within a range of 0.1–0.3 d from a corner of a seal edge of said funnel when a diagonal length on the outer surface of said funnel is "d"; and within a range defined by rotating the diagonal of the outer surface of said funnel by 0–30° and within a range of 0.1–0.3 d from a corner of a seal edge of said funnel.

12. The beam-index-type cathode ray tube according to claim 11, wherein the vacuum comprises a plurality of funnels each having a neck, the beam-index-type cathode ray tube further comprising:

at least one additional electron gun mounted in a corresponding one of the necks;

at least one additional deflection yoke mounted around a corresponding one of the necks;

at least one additional transparent light reception window provided on a corresponding one of the necks; and at least one additional detector to generate an index electric signal by condensing index light generated from a corresponding one of the additional transparent light reception windows, wherein each said light reception window and corresponding detector is positioned along a diagonal of the outer surface of said corresponding funnel within a range of 0.1–0.3 d from a corner of a seal edge of said corresponding funnel.

13. The beam-index-type cathode ray tube according to claim 11, wherein the vacuum comprises a plurality of funnels each having a neck, the beam-index-type cathode ray tube further comprising:

at least one additional electron gun mounted in a corresponding one of the necks;

at least one additional deflection yoke mounted around a corresponding one of the necks;

at least one additional transparent light reception window provided on a corresponding one of the necks; and at least one additional detector to generate an index electric signal by condensing index light generated from a corresponding one of the additional transparent light reception windows, wherein each said light reception window and corresponding detector is within a range defined by rotating a diagonal of the outer surface of said corresponding funnel by 0–30° and within a range of 0.1–0.3 d from a corner of a seal edge of said corresponding funnel.

* * * * *